US009959908B2

(12) United States Patent
Roberts et al.

(10) Patent No.: US 9,959,908 B2
(45) Date of Patent: *May 1, 2018

(54) MEDIA CONTENT RECORDING AND HEALING STATUSES

(75) Inventors: Brian Roberts, Frisco, TX (US); Heath Stallings, Grapevine, TX (US); Don Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 948 days.

This patent is subject to a terminal disclaimer.

(21) Appl. No.: 13/353,902

(22) Filed: Jan. 19, 2012

(65) Prior Publication Data

US 2012/0114300 A1 May 10, 2012

Related U.S. Application Data

(63) Continuation of application No. 11/769,863, filed on Jun. 28, 2007, now Pat. No. 8,103,965.

(51) Int. Cl.

| H04N 5/76 | (2006.01) |
|---|---|
| G06F 3/048 | (2013.01) |
| G11B 27/34 | (2006.01) |
| G11B 27/034 | (2006.01) |
| G11B 27/10 | (2006.01) |
| H04N 5/765 | (2006.01) |
| H04N 5/775 | (2006.01) |
| H04N 5/85 | (2006.01) |
| H04N 21/41 | (2011.01) |
| H04N 21/488 | (2011.01) |

(52) U.S. Cl.
CPC ............ *G11B 27/34* (2013.01); *G11B 27/034* (2013.01); *G11B 27/105* (2013.01); *H04N 5/76* (2013.01); *H04N 5/765* (2013.01); *H04N 5/775* (2013.01); *H04N 5/85* (2013.01); *H04N 21/4104* (2013.01); *H04N 21/488* (2013.01)

(58) Field of Classification Search
CPC .................................. H04N 5/76; G06F 3/048
USPC .......................................... 386/239; 715/772
See application file for complete search history.

(56) References Cited

U.S. PATENT DOCUMENTS

| 4,977,455 A | 12/1990 | Young |
|---|---|---|
| 5,151,789 A | 9/1992 | Young |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |

(Continued)

*Primary Examiner* — Kieu D Vu
*Assistant Examiner* — Darrin Hope

(57) ABSTRACT

An exemplary system includes a content processing subsystem configured to record at least a subset of a media content program and detect a defective portion of the recorded media content program that failed to be properly recorded. The content processing subsystem is further configured to provide a recording status indicator to an output device for presentation to a user, the recording status indicator identifying the defective portion of the recorded media content program. In certain implementations, the content processing subsystem is further configured to heal at least a subset of the defective portion of the recorded media content program and provide a healing status indicator to the output device for presentation to the user, the healing status indicator identifying the healed portion of the recorded media content program.

3 Claims, 8 Drawing Sheets

(56) References Cited

U.S. PATENT DOCUMENTS

| | | |
|---|---|---|
| 5,382,983 A | 1/1995 | Kwoh et al. |
| 5,479,266 A | 12/1995 | Young et al. |
| 5,479,268 A | 12/1995 | Young et al. |
| 5,499,103 A | 3/1996 | Mankovitz |
| 5,512,963 A | 4/1996 | Mankovitz |
| 5,515,173 A | 5/1996 | Mankovitz et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,600,711 A | 2/1997 | Yuen |
| 5,619,274 A | 4/1997 | Roop et al. |
| 5,640,484 A | 6/1997 | Mankovitz |
| 5,684,525 A | 11/1997 | Klosterman |
| 5,701,383 A | 12/1997 | Russo et al. |
| 5,706,145 A | 1/1998 | Hindman et al. |
| 5,734,786 A | 3/1998 | Mankovitz |
| 5,790,198 A | 8/1998 | Roop et al. |
| 5,801,787 A | 9/1998 | Schein et al. |
| 5,808,608 A | 9/1998 | Young et al. |
| 5,809,204 A | 9/1998 | Young et al. |
| 5,812,205 A | 9/1998 | Milnes et al. |
| 5,828,945 A | 10/1998 | Klosterman |
| 5,870,150 A | 2/1999 | Yuen |
| 5,886,746 A | 3/1999 | Yuen et al. |
| 5,915,026 A | 6/1999 | Mankovitz |
| 5,923,362 A | 7/1999 | Klosterman |
| 5,940,073 A | 8/1999 | Klosterman et al. |
| 5,949,954 A | 9/1999 | Young et al. |
| 5,959,688 A | 9/1999 | Schein et al. |
| 5,969,748 A | 10/1999 | Casement et al. |
| 5,970,206 A | 10/1999 | Yuen et al. |
| 5,974,222 A | 10/1999 | Yuen et al. |
| 5,987,213 A | 11/1999 | Mankovitz et al. |
| 5,991,498 A | 11/1999 | Young |
| 6,002,394 A | 12/1999 | Schein et al. |
| 6,016,141 A | 1/2000 | Knudson et al. |
| 6,028,599 A | 2/2000 | Yuen et al. |
| 6,049,652 A | 4/2000 | Yuen et al. |
| 6,052,145 A | 4/2000 | MacRae et al. |
| 6,072,983 A | 6/2000 | Klosterman |
| 6,075,551 A | 6/2000 | Berezowski et al. |
| 6,075,575 A | 6/2000 | Schein et al. |
| 6,078,348 A | 6/2000 | Klosterman et al. |
| 6,091,882 A | 7/2000 | Yuen et al. |
| 6,118,492 A | 9/2000 | Milnes et al. |
| 6,133,909 A | 10/2000 | Schein et al. |
| 6,137,950 A | 10/2000 | Yuen |
| 6,144,401 A | 11/2000 | Casement et al. |
| 6,151,059 A | 11/2000 | Schein et al. |
| 6,167,188 A | 12/2000 | Young et al. |
| 6,177,931 B1 | 1/2001 | Alexander et al. |
| 6,216,265 B1 | 4/2001 | Roop et al. |
| 6,239,794 B1 | 5/2001 | Yuen et al. |
| 6,262,722 B1 | 7/2001 | Allison et al. |
| 6,263,501 B1 | 7/2001 | Schein et al. |
| 6,311,207 B1 | 10/2001 | Mighdoll et al. |
| 6,317,780 B1 | 11/2001 | Cohn et al. |
| 6,317,791 B1 | 11/2001 | Cohn et al. |
| 6,317,885 B1 | 11/2001 | Fries |
| 6,323,911 B1 | 11/2001 | Schein et al. |
| 6,327,418 B1 | 12/2001 | Barton |
| 6,330,719 B1 | 12/2001 | Zigmond et al. |
| 6,340,997 B1 | 1/2002 | Borseth |
| 6,341,195 B1 | 1/2002 | Mankovitz et al. |
| 6,341,374 B2 | 1/2002 | Schein et al. |
| 6,344,865 B1 | 2/2002 | Matthews et al. |
| 6,345,264 B1 | 2/2002 | Breese et al. |
| 6,353,813 B1 | 3/2002 | Breese et al. |
| 6,378,035 B1 | 4/2002 | Parry et al. |
| 6,385,739 B1 | 5/2002 | Barton et al. |
| 6,388,714 B1 | 5/2002 | Schein et al. |
| 6,392,664 B1 | 5/2002 | White et al. |
| 6,396,473 B1 | 5/2002 | Callahan et al. |
| 6,396,546 B1 | 5/2002 | Alten et al. |
| 6,397,388 B1 | 5/2002 | Allen |
| 6,400,407 B1 | 6/2002 | Zigmond et al. |
| 6,412,110 B1 | 6/2002 | Schein et al. |
| 6,412,112 B1 | 6/2002 | Barrett et al. |
| 6,424,342 B1 | 7/2002 | Perlman et al. |
| 6,425,125 B1 | 7/2002 | Fries et al. |
| 6,430,358 B1 | 8/2002 | Yuen et al. |
| 6,430,359 B1 | 8/2002 | Yuen et al. |
| 6,449,766 B1 | 9/2002 | Fleming |
| 6,453,471 B1 | 9/2002 | Klosterman |
| 6,460,180 B1 | 10/2002 | Park et al. |
| 6,460,181 B1 | 10/2002 | Donnelly |
| 6,463,486 B1 | 10/2002 | Parry et al. |
| 6,466,734 B2 | 10/2002 | Yuen et al. |
| 6,469,721 B2 | 10/2002 | Matthews et al. |
| 6,469,753 B1 | 10/2002 | Klosterman et al. |
| 6,473,858 B1 | 10/2002 | Shimomura et al. |
| 6,477,705 B1 | 11/2002 | Yuen et al. |
| 6,487,646 B1 | 11/2002 | Adams et al. |
| 6,489,986 B1 | 12/2002 | Allen |
| 6,490,722 B1 | 12/2002 | Barton et al. |
| 6,496,205 B1 | 12/2002 | White et al. |
| 6,498,754 B2 | 12/2002 | Peting et al. |
| 6,498,895 B2 | 12/2002 | Young et al. |
| 6,499,057 B1 | 12/2002 | Portuesi |
| 6,505,232 B1 | 1/2003 | Mighdoll et al. |
| 6,505,348 B1 | 1/2003 | Knowles et al. |
| 6,519,771 B1 | 2/2003 | Zenith |
| 6,526,471 B1 | 2/2003 | Shimomura et al. |
| 6,526,580 B2 | 2/2003 | Shimomura et al. |
| 6,529,233 B1 | 3/2003 | Allen |
| 6,535,253 B2 | 3/2003 | Barton et al. |
| 6,535,920 B1 | 3/2003 | Parry et al. |
| 6,538,701 B1 | 3/2003 | Yuen |
| 6,539,375 B2 | 3/2003 | Kawasaki |
| 6,549,719 B2 | 4/2003 | Mankovitz |
| 6,559,866 B2 | 5/2003 | Kolde et al. |
| 6,559,894 B2 | 5/2003 | Omura et al. |
| 6,560,678 B1 | 5/2003 | Weissman et al. |
| 6,560,777 B2 | 5/2003 | Blackketter et al. |
| 6,564,379 B1 | 5/2003 | Knudson et al. |
| 6,567,606 B2 | 5/2003 | Milnes et al. |
| 6,570,581 B1 | 5/2003 | Smith |
| 6,571,390 B1 | 5/2003 | Dunn et al. |
| 6,571,392 B1 | 5/2003 | Zigmond et al. |
| 6,577,346 B1 | 6/2003 | Perlman |
| 6,588,013 B1 | 7/2003 | Lumley et al. |
| 6,606,652 B1 | 8/2003 | Cohn et al. |
| 6,628,301 B1 | 9/2003 | Acton et al. |
| 6,628,302 B2 | 9/2003 | White et al. |
| 6,630,963 B1 | 10/2003 | Billmaier |
| 6,631,523 B1 | 10/2003 | Matthews et al. |
| 6,633,877 B1 | 10/2003 | Saigh et al. |
| 6,637,031 B1 | 10/2003 | Chou |
| 6,637,032 B1 | 10/2003 | Feinleib |
| 6,642,939 B1 | 11/2003 | Vallone et al. |
| 6,643,798 B2 | 11/2003 | Barton et al. |
| 6,651,251 B1 | 11/2003 | Shoff et al. |
| 6,662,218 B2 | 12/2003 | Mighdoll et al. |
| 6,668,133 B2 | 12/2003 | Yuen et al. |
| 6,668,377 B1 | 12/2003 | Dunn |
| 6,678,737 B1 | 1/2004 | Bucher |
| 6,681,396 B1 | 1/2004 | Bates et al. |
| 6,683,630 B1 | 1/2004 | Shoff et al. |
| 6,684,025 B1 | 1/2004 | Perlman |
| 6,687,906 B1 | 2/2004 | Yuen et al. |
| 6,694,352 B1 | 2/2004 | Omoigui |
| 6,698,020 B1 | 2/2004 | Zigmond et al. |
| 6,704,058 B2 | 3/2004 | Ranta |
| 6,704,773 B1 | 3/2004 | Cohn et al. |
| 6,704,776 B1 | 3/2004 | Fortune |
| 6,704,813 B2 | 3/2004 | Smirnov et al. |
| 6,704,929 B1 | 3/2004 | Ozer et al. |
| 6,708,335 B1 | 3/2004 | Ozer et al. |
| 6,710,815 B1 | 3/2004 | Billmaier et al. |
| 6,721,953 B1 | 4/2004 | Bates et al. |
| 6,724,405 B2 | 4/2004 | Matthews et al. |

(56) References Cited

U.S. PATENT DOCUMENTS

| | | |
|---|---|---|
| 6,727,935 B1 | 4/2004 | Allen et al. |
| 6,728,713 B1 | 4/2004 | Beach et al. |
| 6,732,325 B1 | 5/2004 | Tash et al. |
| 6,732,369 B1 | 5/2004 | Schein et al. |
| 6,742,043 B1 | 5/2004 | Moussa et al. |
| 6,742,183 B1 | 5/2004 | Reynolds et al. |
| 6,745,391 B1 | 6/2004 | MacRae et al. |
| 6,748,375 B1 | 6/2004 | Wong et al. |
| 6,748,481 B1 | 6/2004 | Parry et al. |
| 6,754,715 B1 | 6/2004 | Cannon et al. |
| 6,756,997 B1 | 6/2004 | Ward et al. |
| 6,757,837 B1 | 6/2004 | Platt et al. |
| 6,757,906 B1 | 6/2004 | Look et al. |
| 6,760,537 B2 | 7/2004 | Mankovitz |
| 6,762,773 B2 | 7/2004 | Kolde et al. |
| 6,766,523 B2 | 7/2004 | Herley |
| 6,766,524 B1 | 7/2004 | Matheny et al. |
| 6,772,438 B1 | 8/2004 | Blackketter et al. |
| 6,785,901 B1 | 8/2004 | Horiwitz et al. |
| 6,785,902 B1 | 8/2004 | Zigmond et al. |
| 6,792,195 B2 | 9/2004 | Barton |
| 6,798,457 B2 | 9/2004 | Boyden et al. |
| 6,798,971 B2 | 9/2004 | Potrebic |
| 6,799,326 B2 | 9/2004 | Boylan et al. |
| 6,799,327 B1 | 9/2004 | Reynolds et al. |
| 6,813,643 B2 | 11/2004 | Perlman |
| 6,850,693 B2 | 2/2005 | Young et al. |
| 6,854,127 B1 * | 2/2005 | Kanemitsu ............. H04H 60/37 348/460 |
| 6,859,799 B1 | 2/2005 | Yuen |
| 6,906,755 B2 | 6/2005 | Lundblad et al. |
| 6,975,717 B1 | 12/2005 | Smith et al. |
| 7,039,935 B2 | 5/2006 | Knudson et al. |
| 7,069,576 B1 | 6/2006 | Knudson et al. |
| 7,487,529 B1 | 2/2009 | Orlick |
| 2001/0029610 A1 | 10/2001 | Corvin et al. |
| 2001/0047298 A1 | 11/2001 | Moore et al. |
| 2001/0049820 A1 | 12/2001 | Barton |
| 2001/0054181 A1 | 12/2001 | Corvin |
| 2002/0073424 A1 | 6/2002 | Ward et al. |
| 2002/0124255 A1 | 9/2002 | Reichardt et al. |
| 2003/0005445 A1 | 1/2003 | Schein et al. |
| 2003/0056219 A1 | 3/2003 | Reichardt et al. |
| 2003/0110495 A1 | 6/2003 | Bennington et al. |
| 2003/0110499 A1 | 6/2003 | Knudson et al. |
| 2003/0115599 A1 | 6/2003 | Bennington et al. |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0204847 A1 | 10/2003 | Ellis et al. |
| 2003/0208756 A1 | 11/2003 | MacRae et al. |
| 2003/0219228 A1 | 11/2003 | Thiagarajan et al. |
| 2003/0221192 A1 | 11/2003 | Rappaport et al. |
| 2004/0006634 A1 * | 1/2004 | Ferris ..................... 709/231 |
| 2004/0010806 A1 | 1/2004 | Yuen et al. |
| 2004/0045025 A1 | 3/2004 | Ward et al. |
| 2004/0107437 A1 | 6/2004 | Reichardt et al. |
| 2004/0168189 A1 | 8/2004 | Reynolds et al. |
| 2004/0194138 A1 | 9/2004 | Boylan et al. |
| 2004/0261098 A1 | 12/2004 | MacRae et al. |
| 2005/0010949 A1 | 1/2005 | Ward et al. |
| 2005/0028201 A1 | 2/2005 | Klosterman et al. |
| 2005/0066063 A1 * | 3/2005 | Grigorovitch ......... H04N 7/163 710/1 |
| 2005/0125823 A1 | 6/2005 | McCoy et al. |
| 2005/0149964 A1 | 7/2005 | Thomas et al. |
| 2005/0155056 A1 | 7/2005 | Knee et al. |
| 2005/0216936 A1 | 9/2005 | Knudson et al. |
| 2005/0251824 A1 | 11/2005 | Thomas et al. |
| 2006/0008243 A1 * | 1/2006 | Przybylek ................ 386/46 |
| 2006/0045470 A1 * | 3/2006 | Poslinski et al. ............... 386/68 |
| 2006/0156336 A1 | 7/2006 | Knudson et al. |
| 2006/0212894 A1 | 9/2006 | Knudson et al. |
| 2006/0277574 A1 | 12/2006 | Schein et al. |
| 2006/0288366 A1 | 12/2006 | Boylan et al. |
| 2007/0016926 A1 | 1/2007 | Ward et al. |
| 2007/0033613 A1 | 2/2007 | Ward et al. |
| 2007/0107010 A1 | 5/2007 | Jolna et al. |
| 2009/0125843 A1 | 5/2009 | Billmaier et al. |

\* cited by examiner

US 9,959,908 B2

MEDIA CONTENT RECORDING AND HEALING STATUSES

RELATED APPLICATIONS

This application is a continuation application of U.S. patent application Ser. No. 11/769,863 by Brian Roberts et al., filed on Jun. 28, 2007, and entitled MEDIA CONTENT RECORDING AND HEALING STATUSES, which is hereby incorporated by reference in its entirety.

BACKGROUND INFORMATION

The set-top box ("STB") has become an important computing device for accessing media content services and the media content within those services. An STB or a separate device connected to the STB may be able to record broadcast media content, thereby allowing a user to experience recorded media content after the broadcast. Unfortunately, a conventional STB generally is not equipped to provide users with certain information or tools related to special media content recording events such as a failure to record a portion of a media program (e.g., due to a power interruption) and/or operations for repairing a defective recording of media content.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical reference numbers designate identical or similar elements.

DETAILED DESCRIPTION OF PREFERRED EMBODIMENTS

I. Introduction

Exemplary media content recording and healing systems and methods and associated statuses, indicators, and tools are disclosed herein. In certain implementations, a media content processing subsystem (e.g., a set-top box) may be configured to record at least a subset of a media content program. In certain situations, the recorded media content program may be defective because it failed to be properly recorded (e.g., a portion was not recorded, a portion was recorded but is now damaged, a portion was mis-recorded due to interference and/or equipment error, etc.). The media content processing subsystem may be configured to detect defective recorded media content programs and provide a recording status indicator to an output device for presentation to a user, the recording status indicator identifying the portion(s) of the recorded media content program that are causing it to be defective (hereinafter, the "defective portion (s)" of the recorded media content program). The media content processing subsystem may be further configured to "heal" at least a subset of the defective portion(s) of the recorded media content program and to provide a healing indicator to the output device for presentation to the user, the healing indicator identifying a healed portion of the recorded media content program.

Accordingly, a user of the content processing subsystem can be informed of defective recorded media content programs, which portion(s), if any, of a recorded media content program are causing it to be defective, as well as the status of operations configured to heal the defective portion(s). The status indicators may help the user better understand the status of a recording process, including any special circumstances (e.g., recording failures) associated with the process, and the capabilities of the media content processing subsystem for healing a defective recording.

Components and functions of exemplary implementations of media content recording and healing systems and methods and associated statuses, indicators, and tools will now be described in more detail.

II. Exemplary System View

Figure 1:
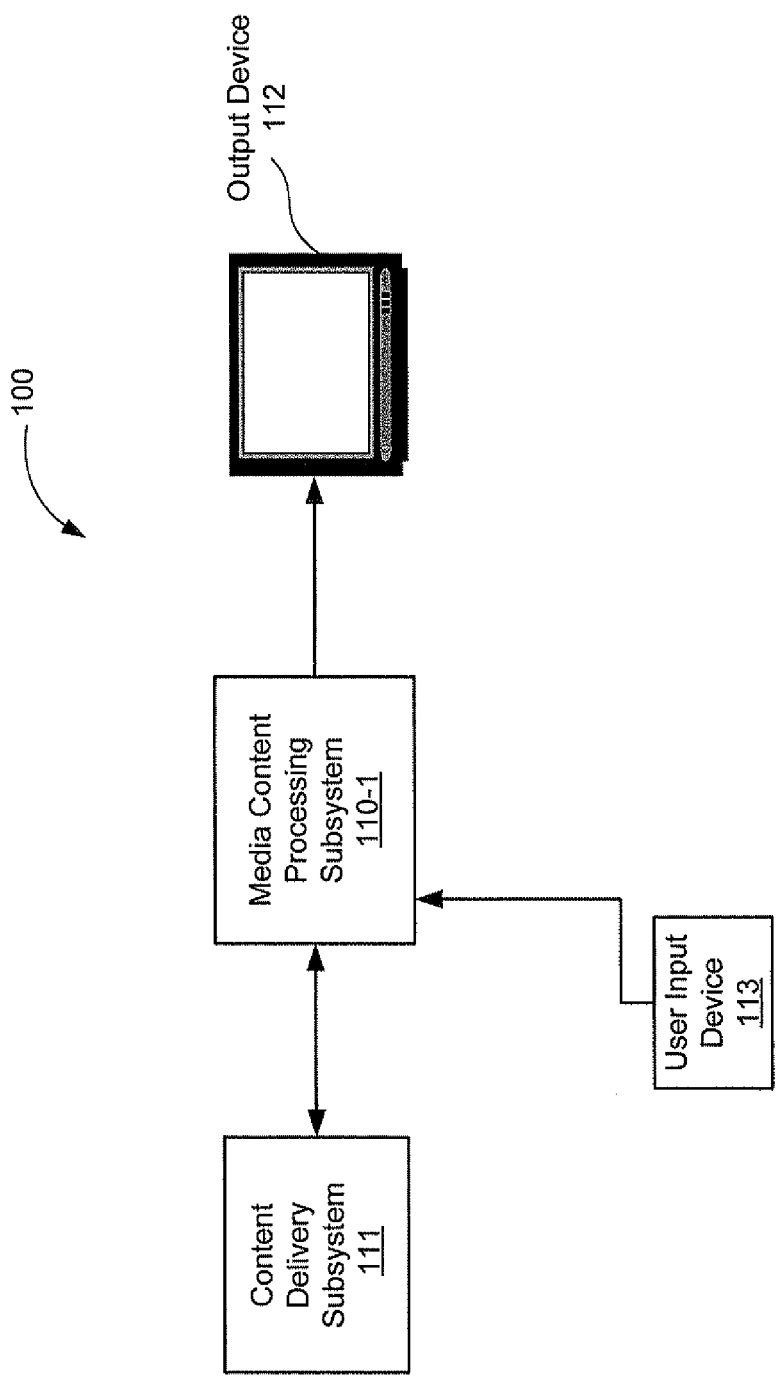
FIG. 1 illustrates an example of a media content access system.

FIG. 1 illustrates an example of a media content access system 100 (or simply the "system 100"). As shown in FIG. 1, the system 100 may include a media content processing subsystem 110-1 configured to communicate with and receive a signal or data stream containing data representative of media content and/or other content (e.g., media content metadata and/or program guide data) from a content delivery subsystem 111. The media content processing subsystem 110-1 may be configured to process a media content stream provided by the content delivery subsystem 111, including recording and/or providing a media content program, or one or more components (e.g., video and/or audio components) of a media content program, to an output device 112 (e.g., a television, computer monitor, etc.) for presentation (e.g., display and/or audio broadcast) to a user. The media content processing subsystem 110-1 may be controlled by a user input device 113 (e.g., a remote control device).

While an exemplary media content access system 100 is shown in FIG. 1, the exemplary components illustrated in FIG. 1 are not intended to be limiting. Indeed, additional or alternative components and/or implementations may be used, as is well known. Each of the components of system 100 will now be described in additional detail.

A. Content Delivery Subsystem

The content delivery subsystem 111 may include any device or devices (e.g., a content server) configured for receiving, storing, processing, or providing media content. The content delivery subsystem 111 may be configured to communicate with the media content processing subsystem 110-1 via one or more types of communications networks (and communications links thereto), including, but not limited to, the Internet, an intranet or other private packet-switched network, a wireless network (e.g., a wireless phone network or a Wi-Fi network), a cable television network (e.g., a hybrid fiber-coax network), a wireless broadcast network (e.g., a satellite media broadcasting network or terrestrial broadcasting network), a subscriber television network, a telephone network, a provider-specific network (e.g., a Verizon® FIOS® network and/or a TiVo® network), an optical fiber network, a local area network, any other suitable network, and any combination of these networks. In some alternative examples, the media content processing subsystem 110-1 may be connected directly to the content delivery subsystem 111.

The media content processing subsystem 110-1 and content delivery subsystem 111 may communicate using any known communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), User Datagram Protocol ("UDP"), socket connections, Ethernet, and other suitable communications technologies. Devices included in the content delivery subsystem 111 may communicate with one another using any of the communication technologies and/or networks listed herein.

Content delivery subsystem 111 may be configured to provide (e.g., transmit) various types of media content, media content metadata, program guide data, and/or other content or data to the media content processing subsystem 110-1 using any suitable communication technologies, including any of those described herein. The media content may include one or more media content programs, or one or more segments of the media content program(s). The term "media content program" as used herein refers generally to any television program, on demand program, pay-per-view program, broadcast media program, narrowcast media program, IPTV content, video, movie, song, audio, or any segment, component, or combination of these or other forms of media content that may be viewed or otherwise experienced by a user.

B. Output Device

As mentioned, the media content processing subsystem 110-1 may be coupled to an output device 112 configured to present content, including media content and/or program guide data, to a user. The output device 112 may display, play, or otherwise present the content for experiencing by the user. The output device 112 may include, but is not limited to, a television, computer monitor, mobile phone, handheld device, display screen, or any other device configured to present content to a user.

The output device 112 may be configured to display graphical user interfaces. Accordingly, media content, program guide data, and any other content, information, tools, or indicators (e.g., a recording status indicator, a recording failure status indicator, and a content healing indicator) may be displayed in a graphical user interface.

C. Media Content Processing Subsystem

Figure 2:
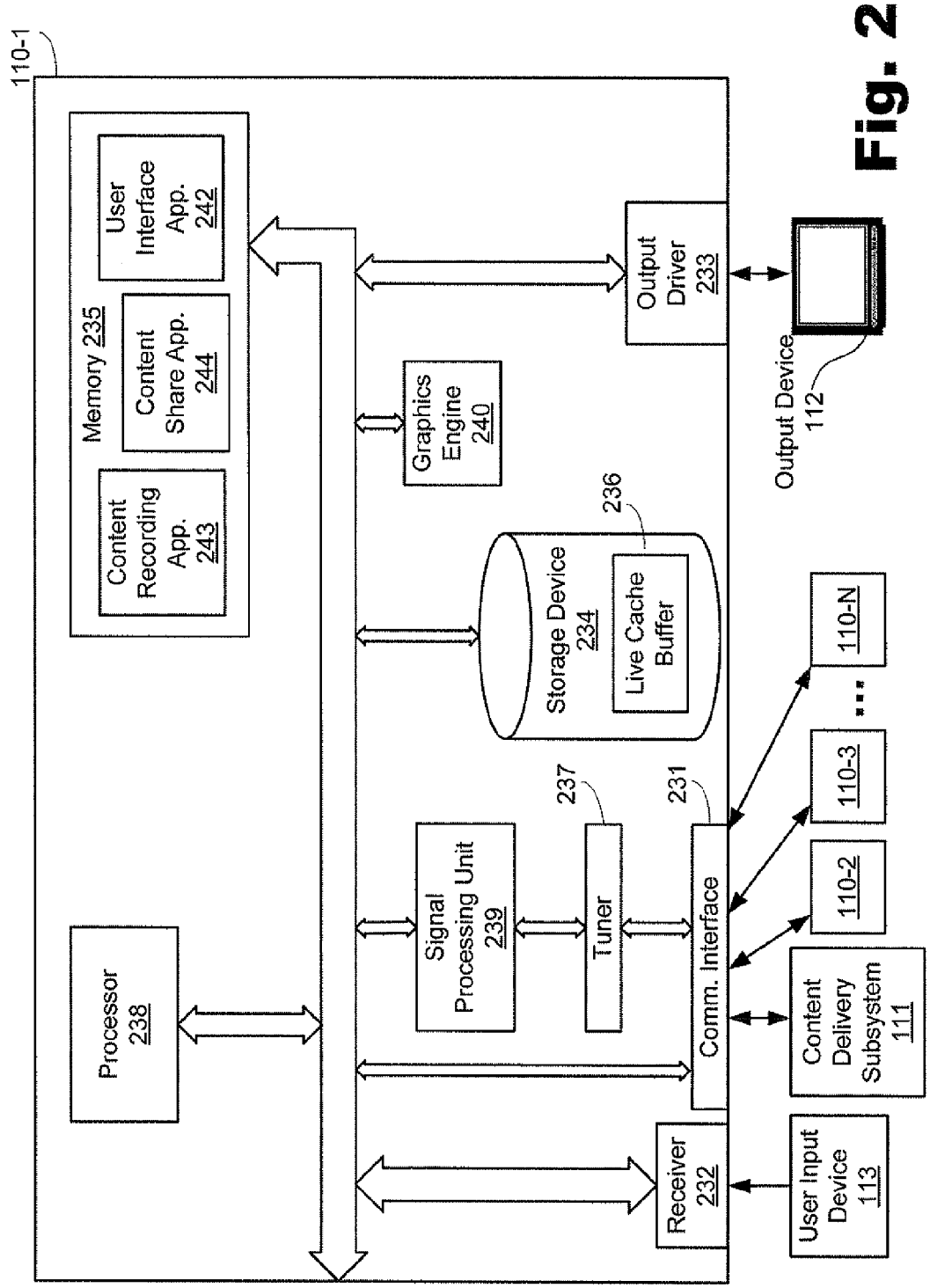
FIG. 2 illustrates an exemplary media content processing subsystem.

FIG. 2 is a block diagram of an exemplary media content processing subsystem 110-1 (or simply "content processing subsystem 110-1" or "processing subsystem 110-1"). The processing subsystem 110-1 may include any combination of hardware, software, and firmware configured to process media content and/or other content or data for presentation to a user. As used herein and in the appended claims, unless otherwise specifically denoted, the terms "media content processing subsystem," content processing subsystem," and "processing subsystem" will be used to refer expansively to all possible receivers that receive and process (e.g., record) digital and/or analog media content. An exemplary processing subsystem 110-1 may include, but is not limited to, a set-top box ("STB"), home communication terminal ("HCT"), digital home communication terminal ("DHCT"), personal video recorder ("PVR") (e.g., a digital video recorder ("DVR")), DVD player, handheld entertainment device, video-enabled phone (e.g., a mobile phone), and personal computer.

In certain implementations, the processing subsystem 110-1 may include any computer hardware and/or instructions (e.g., software programs), or combinations of software and hardware, configured to perform the processes described herein. In particular, it should be understood that processing subsystem 110-1 may be implemented on one physical computing device or may be implemented on more than one physical computing device. Accordingly, processing subsystem 110-1 may include any one of a number of well known computing devices, and may employ any of a number of well known computer operating systems, including, but by no means limited to, known versions and/or varieties of the Microsoft Windows® operating system, the UNIX operating system, Macintosh® operating system, and the Linux® operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary processing subsystem 110-1 is shown in FIG. 2, the exemplary components illustrated in FIG. 2 are not intended to be limiting. Indeed, additional or alternative components and/or implementations may be used. Various components of the processing subsystem 110-1 will now be described in additional detail.

1. Communication Interfaces

As shown in FIG. 2, the processing subsystem 110-1 may include a communication interface 231 configured to receive content (e.g., media content) and/or data (e.g., media content metadata and/or program guide information) in any acceptable format from the content delivery subsystem 111 or from any other suitable media content source(s). For example, the media content may be received as a real-time broadcast transmission or as any other suitable transmission. The communication interface 231 may include any device, logic, and/or other technologies suitable for receiving signals and/or data representative of media content and/or other types of content or data. The communication interface 231 may be configured to interface with any suitable communication media, protocols, and formats, including any of those mentioned above.

In certain implementations, the communication interface 231 may include a single port configured to receive content and/or data from the content delivery subsystem 111 and/or from any other source. For example, the communication interface 231 may include or be connected to a broadband connection, which can enable the processing subsystem 110-1 to receive content from one or more sources on a single port. In other implementations, multiple ports may be used.

As shown in FIG. 2, the communication interface 231 may be configured for communications with other content processing subsystems 110-2 through 110-N, including requesting and receiving shared media content from any of the other content processing subsystems 110-2 through 110-N. This capability will be described further below in reference to FIG. 4.

The processing subsystem 110-1 may also include a receiver 232 configured to receive user input signals (e.g., content recording and/or playback commands) from a user input device 113. The user input device 113 may include, for example, a remote control device or any other suitable input device and may be configured to communicate with the receiver 232 via a wireless link, electrical connection, or any other suitable communication link.

Figure 3:
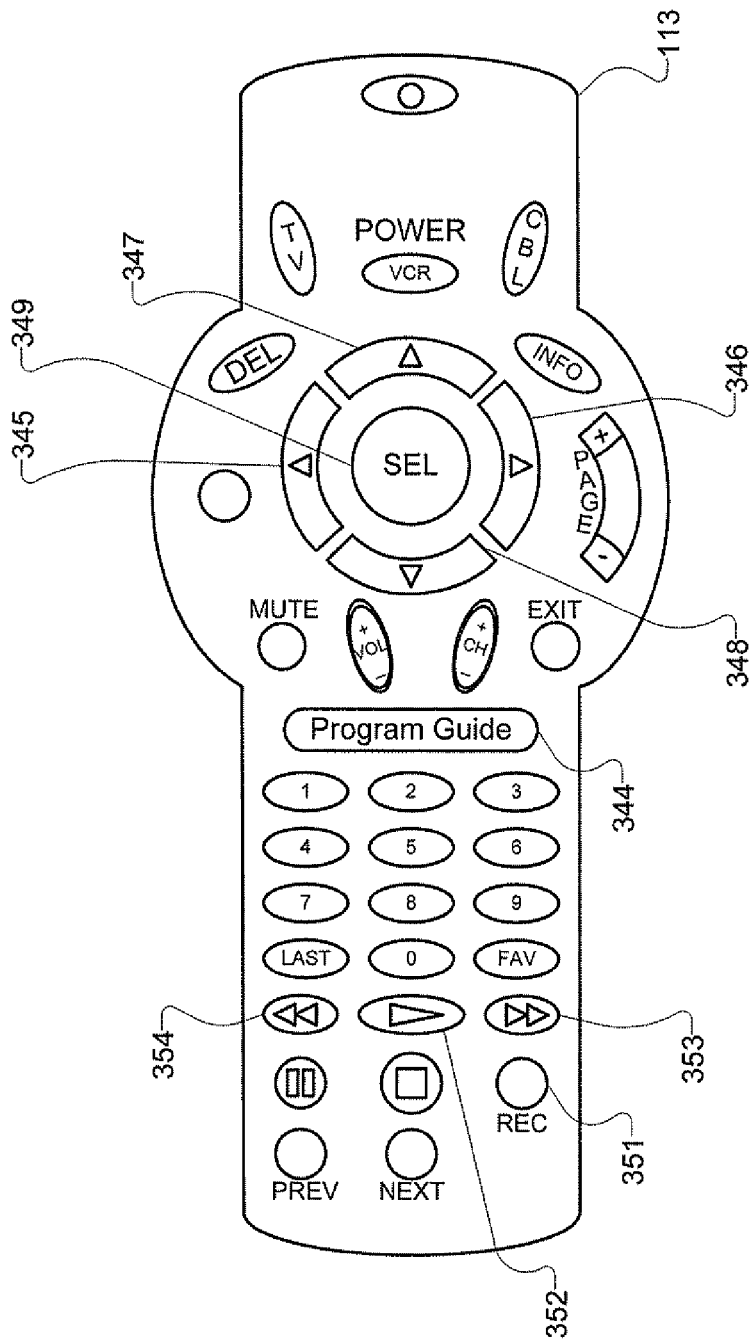
FIG. 3 illustrates an exemplary remote control user input device.

An exemplary remote control user input device 113 is illustrated in FIG. 3. In some examples, the input device 113 may be configured to enable a user to control viewing options for experiencing media content, recording media content, and/or considering program guide data provided by the processing subsystem 110-1. A program guide button 344 may be configured to evoke the display of a program guide GUI on the output device 112. A left button 345, right button 346, up button 347, down button 348, and select button 349 may be included and configured to enable the user to evoke and/or navigate through various views, options, and graphical user interfaces displayed by the output device 112.

The input device 113 may include a record button 351 for starting and stopping the recording of media content, a playback button 352 for initiating playback of media content, and fast-forward 353 and rewind 354 buttons for controlling trick play modes, including skipping forward or backward through a media content program. It will be recognized that the input device 113 shown in FIG. 3 is merely illustrative of the many different types of user input devices that may be used in connection with the present systems and methods.

Returning to FIG. 2, the processing subsystem 110-1 may also include an output driver 233 configured to interface with or drive the output device 112. As instructed by one or more processors of the processing subsystem 110-1, the output driver 233 may provide output signals to the output device 112, the output signals including content (e.g., media content and/or graphical user interface content) to be presented by the output device 112 for experiencing by a user. For example, the output driver 233 may provide a program guide GUI to the output device 112 for presentation to the user. The output driver 233 may include any combination of hardware, software, and firmware as may serve a particular application.

2. Storage Devices

Storage device 234 may include one or more data storage media, devices, or configurations and may employ any type, form, and combination of storage media. For example, the storage device 234 may include, but is not limited to, a hard drive, network drive, flash drive, magnetic disc, optical disc, or other non-volatile storage unit. Media content, media content metadata, program guide data, and other content or data may be temporarily and/or permanently stored in the storage device 234. For example, recorded media content may be stored in the storage device 234.

The storage device 234 of FIG. 2 is shown to be a part of the processing subsystem 110-1 for illustrative purposes only. It will be understood that the storage device 234 may additionally or alternatively be located external to the processing subsystem 110-1.

The processing subsystem may also include memory 235. Memory 235 may include, but is not limited to, FLASH memory, random access memory ("RAM"), dynamic RAM ("DRAM"), or a combination thereof. In some examples, as will be described in more detail below, various applications used by the processing subsystem 110-1 may reside in memory 235.

As shown in FIG. 2, the storage device 234 may include one or more live cache buffers 236. The live cache buffer 236 may additionally or alternatively reside in memory 235 or in a storage device external to the processing subsystem 110-1. In some examples, media content may be temporarily stored in the live cache buffer 236 to facilitate viewing, playback, or recording of the content.

3. Tuner

Tuner 237 may be configured to selectively receive content (e.g., media content) carried on a particular content channel. For example, tuner 237 may be tuned to a particular content channel such that the content carried on the content channel is received and can be processed by the processing subsystem 110-1.

In some examples, the processing subsystem 110-1 may include multiple tuners 237 such that content carried on different content channels may be concurrently received by the processing subsystem 110-1. For example, the processing subsystem 110-1 may include a first tuner configured to receive content carried on an analog video signal and a second tuner configured to simultaneously receive content carried on a digital compressed signal.

In some examples, media content received at the tuner 237 is temporarily buffered, or stored, in the live cache buffer 236. If there are multiple tuners 237, there may be a live cache buffer 236 corresponding to each of the tuners 237.

While tuner 237 may be used to receive various types of content-carrying signals transmitted (e.g., broadcast) by content delivery subsystem 111, processing subsystem 110-1 may be configured to receive other types of content signals (including media content signals, metadata, and/or program guide data signals) from the content delivery subsystem 111 without using a tuner. For example, content delivery subsystem 111 may transmit digital streams of data packets (e.g., Internet Protocol ("IP") based data packets) that can be received without using a tuner. For such types of content signals, the communication interface 231 may receive and forward the signals directly to other components of the processing subsystem 110-1 (e.g., the processor 238 or signal processing unit 239) without going through the tuner 237. For an IP-based signal, for example, the signal processing unit 239 may function as an IP receiver.

4. Processors

As shown in FIG. 2, the processing subsystem 110-1 may include one or more processors, such as processor 238 configured to control the operations of the processing subsystem 110-1. The processing subsystem 110-1 may also include a signal processing unit 239 configured to process incoming media content. The signal processing unit 239 may be configured, for example, to demodulate and parse encoded digital media content. In some examples, the processing subsystem 110-1 may include one or more signal processing units 239 corresponding to each of the tuners 237. Media content and other content or data received from the content delivery subsystem 111, or from any of the other content processing subsystems 110-2 through 110-N, may be processed by the signal processing unit 239, the processor 238, and/or any other suitable component(s) of the processing subsystem 110-1. For example, media content received by way of the communication interface 231 may be recorded such as by one or more of the processors processing and storing data representative of the media content to the storage device 234.

The processing subsystem 110-1 may also include a graphics engine 240 configured to generate graphics that can be displayed by the output device 112. The graphics may include graphical user interfaces such as, but not limited to, one or more media presentation interfaces, one or more program guide graphical user interfaces including views of at least portions of program guides (e.g., views of different portions of the program guides), and any other suitable user interface. A graphical user interface may include tools for controlling the recording of content, content recording information (recording status indicators such as progress indicators), failed recording status indicators, healing status indicators, tools for controlling the playback of media content, and other graphics. Examples of indicators that may be included in a graphical user interface will be described further below.

5. Application Clients

One or more applications residing within the processing subsystem 110-1 may be executed upon initiation by a user of the processing subsystem 110-1, or upon the occurrence of another predetermined event. The applications, or application clients, may reside in memory 235 or in any other area of the processing subsystem 110-1 and be executed by the processor 238.

As shown in FIG. 2, the processing subsystem 110-1 may include a user interface application 242, a content recording application 243, and a content share application 244 residing in memory 235. The content recording application 243 may be configured to control recording of content, including recording of media content that may be received from the content delivery subsystem 111 as described above.

In certain implementations, for example, content delivery subsystem 111 may provide a real-time transmission of a media content program. The content processing subsystem 110-1 may receive the transmitted program, which may be provided in real time (or at least near real time) to the output device 112 for presentation to a user. Additionally or alternatively, the content processing subsystem 110-1 may record at least a subset of the received media content program for storage and/or subsequent playback. The content recording application 243 may control the recording process, including directing other components of the content processing subsystem 110-1 to perform recording operations such as storing media content to the storage device 234.

On occasion, a recording failure may occur during a media content recording process. For example, a recording interruption may interfere with the recording process and thereby create a recording failure, which may introduce defects into a recording of media content. For instance, at least a sub-portion of a recorded media content program may be defective because it was not properly recorded due at least in part to a recording interruption. A recording interruption may include any event or condition that causes, directly or indirectly, at least a sub-portion of a media content program not to be properly recorded. Examples of recording interruptions may include, but are not limited to, power bumps, power outages, network interruptions, communications interruptions or interferences, scheduling changes, issues associated with the content delivery subsystem 111, issues associated with media content and/or its transmission, and any other event or condition that may cause a defective (e.g., an incomplete) recording to be produced.

The content recording application 243 may be configured to detect a defective recording and/or its cause(s), including any of the recording interruptions listed above. A defective portion of a recording may be detected in any suitable manner. In certain implementations, for example, a recording interruption (e.g., an unsatisfactory communication connection between the content processing subsystem 110-1 and the content delivery subsystem 111) may be detected and the corresponding start time and end time for the detected unsatisfactory connection may be logged. The logged times may be associated with the transmission of a media content program that was being recorded by the content processing subsystem 110-1, thereby allowing the logged times to be used to identify a portion of the media content program that was not, or may not have been, recorded properly. In this or other suitable manner, the content processing subsystem 110-1 is able to identify a defective or potentially defective portion of a recorded media content program.

The content processing subsystem 110-1 may be further configured to determine a length of time for which a recording interruption exists. This may be done in any suitable manner, including using start and end times for the recording interruption to determine its duration. The content processing subsystem 110-1 may utilize the determined duration for further processing. For example, the content processing subsystem 110-1 may initiate one or more predefined operations in response to at least one recording interruption existing for a predetermined length of time. For instance, the content processing subsystem 110-1 may be configured to automatically initiate one or more content healing operations (described below) in response to a recording interruption existing for the predetermined length of time.

An exemplary way of detecting a recording interruption and determining its length may include using timestamp information. The content processing subsystem 110 may be configured to log timestamp data periodically during operation or in response to any predetermined event. For example, when break in power occurs and power is then restored, the content processing subsystem 110 may determine timestamps associated with the power break, including a timestamp associated with loss of power (e.g., the last time stamp recorded before the power break), a timestamp associated with restoration of power (e.g., the first timestamp after power is restored), or a timestamp associated with the resuming of a recording operation, for example. Recorded timestamps associated with recording interruptions may be compared with schedule data to identify a particular portion of a recorded media content program that was not properly recorded (i.e., a defective portion). A similar timestamping operation may be used in the case of a break in communications that interrupts receipt of media content programs.

Alternatively, the content processing subsystem 110 may be configured to detect a defective or potentially defective portion of a recording in other ways, including analyzing media content program data that was received by the content processing subsystem 110 and using the analysis to identify any omissions or errors in the received media content data. In certain examples, this may include analyzing ordering or checksum information (e.g., timestamps, sequence numbering, data packet ordering, checksum information included in data packets) associated with media content. Such analyses may be supported by various well-known MPEG protocols.

Figure 4:
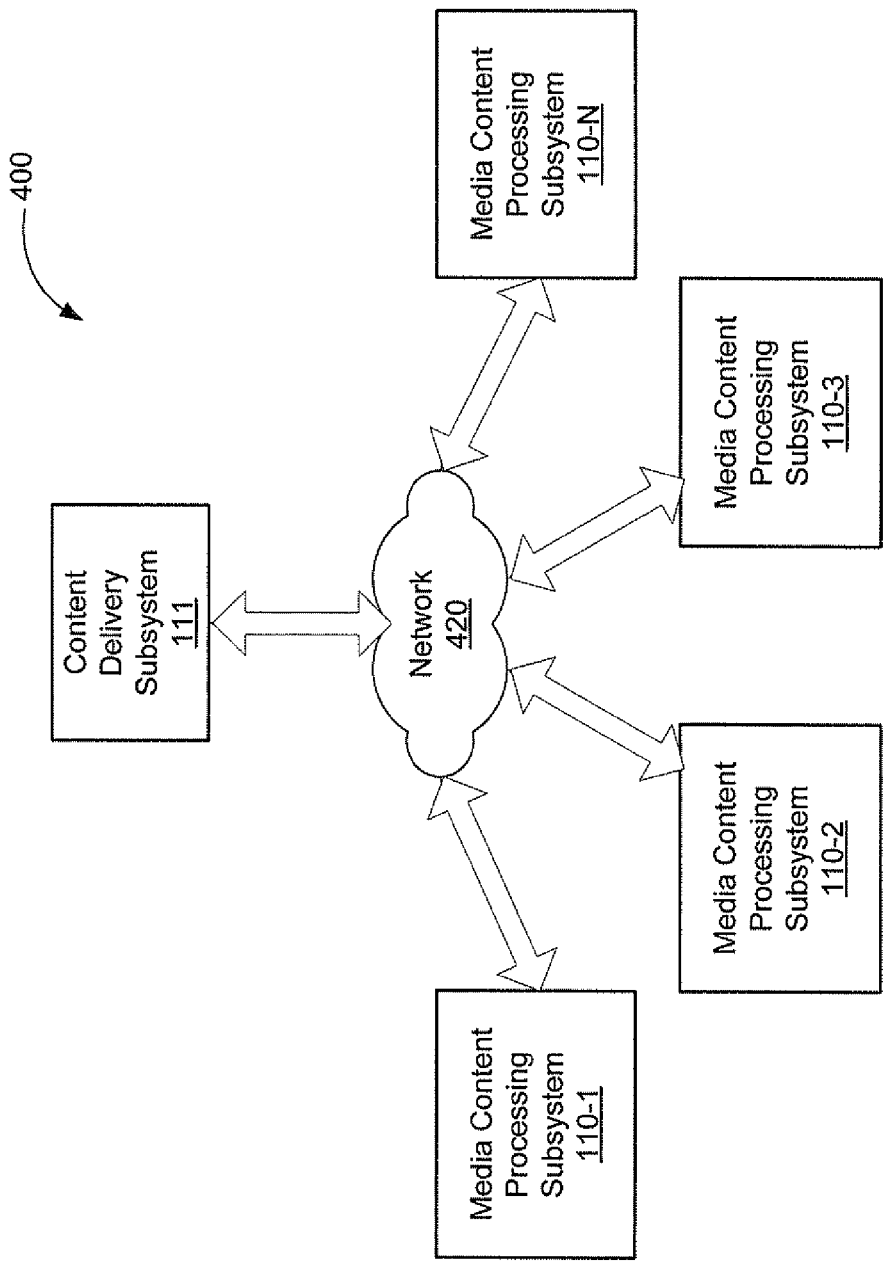
FIG. 4 illustrates another exemplary media content access system.

Additionally or alternatively, recorded media content may be compared to a "master" maintained by the content delivery subsystem 111, a content provider, or another processing subsystem 110 (i.e., a peer processing subsystem 110-2 such as is shown in FIG. 4). Such a comparison may be performed in whole or on a segment-by-segment basis.

For example, a master checksum for a media content program may be maintained by the content delivery subsystem 111, and the content processing subsystem 110 may be configured to generate and maintain a local checksum for a recorded media content program. The local and master checksums may be compared at any suitable point during a recording process or after the recording process has ended. Differences in the checksums may be used to identify defective portions of a recorded media content program, including identifying portions of the recording that may be incorrect due a programming schedule change. For example, a sports-related media content program may last longer than was originally scheduled, which may affect subsequent programming and recording operations, such as a scheduled recording of a subsequent media content program. The content processing subsystem 110 may be configured to compare the local checksum for the recording of the subsequent media content program to determine that a first portion of the subsequent media content program was not recorded, or that a beginning portion of the recording includes data for a different media content program (e.g., the sports program). The latter case may be detected by maintaining unique checksums, or other unique identifiers, for different media content programs. In similar fashion, the master checksum can be used to detect other defective portions of a recording, including defective portions within or at the end of the recording.

Any of the defective content detection procedures described herein may be used in combination. For example, a first detection process (e.g., detection of a recording interruption) may be used to detect a potentially defective portion of a media content recording, and a second detection process (e.g., a comparison of the potentially defective portion to a corresponding segment in a "master" copy) may be used to confirm whether the potentially defective portion is actually defective.

A defective media content recording may be healed. For example, a system may include other content processing subsystems 110-2 through 110-N storing media content that may be used to heal a defective portion of a media content recording maintained by content processing subsystem 110-1. FIG. 4 illustrates an exemplary media content recording and healing system 400, which is essentially the same as or similar to system 100 except that multiple media content processing subsystems 110-1 through 110-N (collectively "media content processing subsystems 110-1") and the content delivery subsystem 111 are illustrated as being able to communicate with one another over a network 420. Network 420 may include and/or support any of the communication networks and/or technologies described above.

In certain implementations, a defective recording produced by media content processing subsystem 110-1 may be healed using media content stored (e.g., recorded) by any of the other media content processing subsystems 110-2 through 110-N in the system 400. The healing may be performed in any of the ways described in co-pending U.S. patent application Ser. No. 11/516,291, entitled "Systems and Methods for Accessing Media Content," filed Sep. 6, 2006 and hereby fully incorporated herein by reference in its entirety. For example, the elements of system 400 (e.g., the content share application 244 of the media content processing subsystem 110-1) may function in any of the ways described in the Ser. No. 11/516,291 application to heal a defective portion of media content. Accordingly, media content processing subsystem 110-1 may record media content, fail to record at least a sub-portion of the media content, and heal the defective portion using shared media content stored on one or more of the media content processing subsystems 110-2 through 110-N.

In an exemplary content healing process, content processing subsystem 110-1, or a user of the processing subsystem 110-1, may identify and request a specific portion of media content that can be used to heal a defective portion of a defective recorded media content program. The request may be sent to the content delivery subsystem 111, which may coordinate with one or more other content processing subsystems 110-2 through 110-N to have the requested media content transmitted to the content processing subsystem 110-1, as described in the Ser. No. 11/516,291 application.

The content processing subsystem 110-1 may receive at least a portion of the requested media content from one or more of the other media content processing subsystems 110-2 through 110-N. Once received, the shared media content may be joined with the defective media content recording in any suitable manner to repair a defective portion of the recorded media content program, thereby healing a defective portion of the recording. For example, a "snippet" of recorded media content as described in co-pending U.S. patent application Ser. No. 11/474,991, entitled "Snippet Access Systems and Methods," filed Jun. 27, 2006 and hereby fully incorporated herein by reference in its entirety, may be requested and received from one or more other media content processing subsystems 110-2 through 110-N and attached at an appropriate position in a media content recording. At least a portion of a shared "snippet" of media content received by the content processing subsystem 110-1 may be attached in any of the ways described in co-pending U.S. patent application Ser. No. 11/614,667, entitled "Content Hosting and Advertising Systems and Methods," filed Dec. 21, 2006 and hereby fully incorporated herein by reference in its entirety, including "stitching" the media content snippet at an appropriate position in the media content recording.

A process of joining a snippet of media content to a recorded media content program in order to heal a defective portion of the recorded media content program may be performed in one step by attaching the entire snippet or in multiple steps that attach different portions of the snippet. For example, portions of a media content snippet may be attached as they are received. For instance, a media content snippet may received and attached over time as a data stream carrying data representative of the media content snippet is received. Additionally or alternatively, portions of a snippet may be received at various times from different sources (e.g., different content processing subsystems 110-2 through 110-N).

Figure 5:
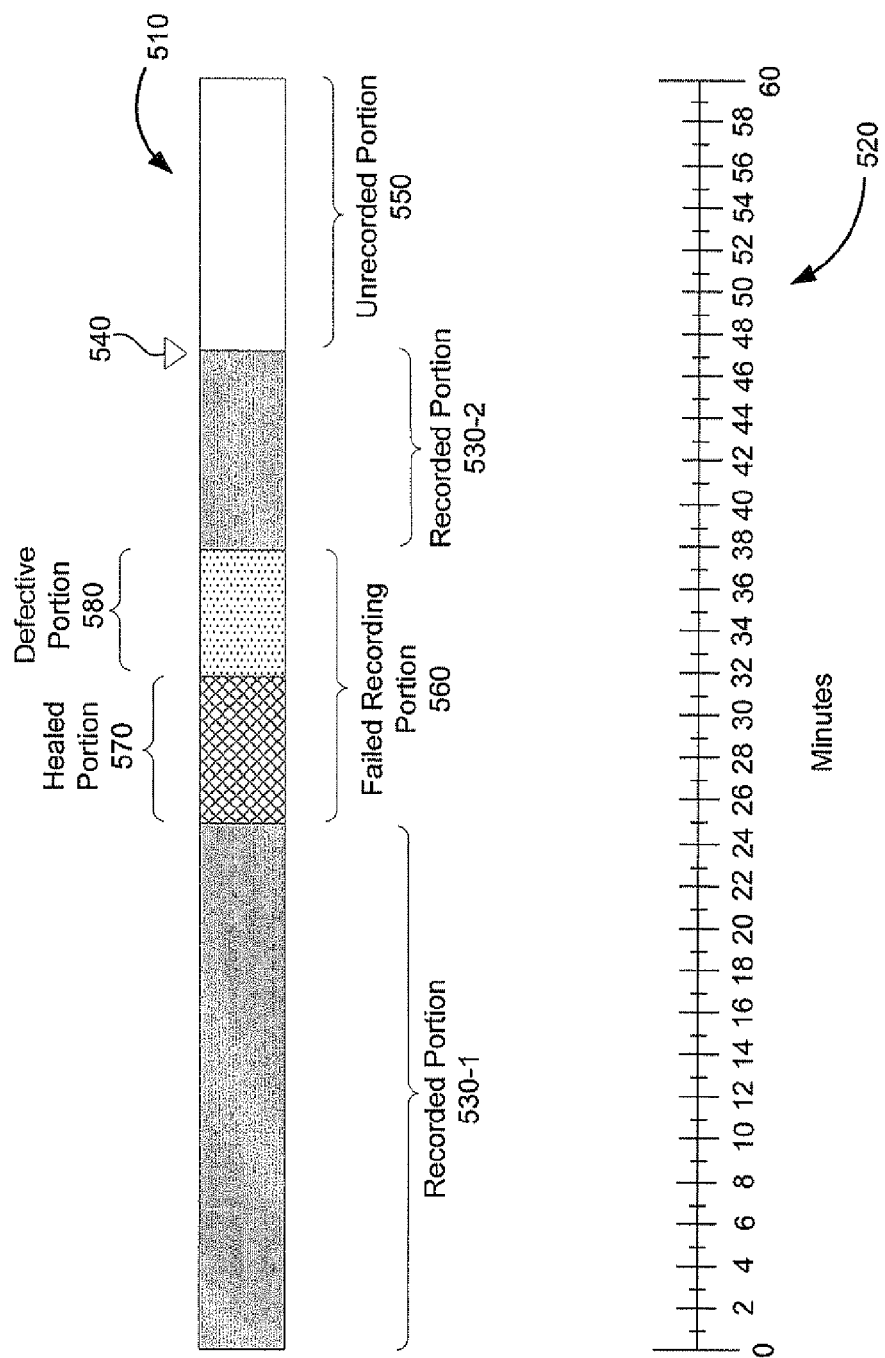
FIG. 5 illustrates an exemplary representation of a media content program.

To facilitate an understanding of recording and healing media content, FIG. 5 illustrates an exemplary representation of a media content program 510 in reference to a time bar 520. The exemplary media content program 510 has a total duration time of sixty ("60") minutes as indicated by the time bar 520.

As mentioned above, the content processing subsystem 110-1 may record the media content program 510 in real time (or near real time) as it is received from the content delivery subsystem 111. A recording interruption may cause at least a sub-portion of the media content program 510 to fail to be properly recorded, and the defective portion of the recorded media content program may be healed, as described above.

FIG. 5 represents a snapshot of the media content program 510 at a particular and exemplary point during recording and healing processes. In FIG. 5, reference numbers 530-1 and 530-2 represent recorded portions of the media content program 510. A recording progress indicator 540 illustrates the current progress of the recording process. An unrecorded portion of the media content program 510 that has not yet been recorded is identified by reference number 550. A failed recording portion (i.e., a portion that was not properly recorded) of the media content program 510 is represented by reference number 560, and a healed portion of the media content program 510 is represented by reference number 570.

In the snapshot represented in FIG. 5, the media content to the right of the recording progress indicator 540 (i.e., unrecorded portion 550) has not yet been subjected to the recording process, while the media content to the left of the recording progress indicator 540 has had a chance to be recorded. Recorded portions 530-1 and 530-2 were properly recorded. However, at least one recording interruption caused segment 560 of the media content program 510 to not be recorded properly. At the point illustrated in FIG. 5, a sub-portion of the failed recording portion 560 has been healed, as indicated by healed portion 570. Accordingly, the healed portion 570 is no longer defective. However, the unhealed portion of segment 560, which is identified by reference number 580 in FIG. 5, remains defective.

Both the recording and the healing processes may continue until a complete and non-defective recording of the media content program 510 has been generated. As the recording process progresses forward from the point shown in FIG. 5, the recording progress indicator 540 will move and one or more portions will adjust in reference to the representation of media content program 510. As the healing process progresses forward from the point shown in FIG. 5, the healed portion 570 and the defective portion 580 will be adjusted accordingly. In other words, recording statuses and associated indicators may be dynamically updated as recording and/or healing processes progress.

FIG. 5 also illustrates one or more recording statuses that may be associated with media content during or after recording and healing processes are performed. In the example of FIG. 5, media content program 510 includes content having recording statuses indicating successfully recorded content, unrecorded content, defectively recorded content, and healed content.

One or more status indicators may be generated and provided for presentation to a user. The status indicators may be configured to inform the user as to the status of recording and/or healing operations. In particular, the user may be informed as to which specific portion(s) of a media content program have been successfully recorded, failed to be recorded, are defective, and/or have been healed. Such information may be valuable to a user for various reasons, including helping the user better understand a recording process and associated operations. In addition, the status indicators may help the user appreciate and value the content healing capabilities of the content processing subsystem 110-1.

The status indicators may include any suitable indicator, including, but not limited to, a visual indicator (e.g., a color, shade, textual message, pop-up message), audio indicator (e.g., playback of an audio message), haptic indicator, or any combination thereof. A status indicator identifying a recording failure (i.e., an improper recording of content) may be referred to as a "failed recording status indicator," a status indicator identifying a defective portion of recorded media content may be referred to as a "defective status indicator," and a status indicator identifying healed content may be referred to as a "healing status indicator."

In certain implementations, the content processing subsystem 110-1 may be configured to provide one or more status indicators in a graphical user interface, which may be provided to the output device 112 for presentation to a user. The status indicators may be included in any type of graphical user interface, including graphical user interfaces presenting media content, program guide content, and/or recording progress information, for example.

Figure 6:
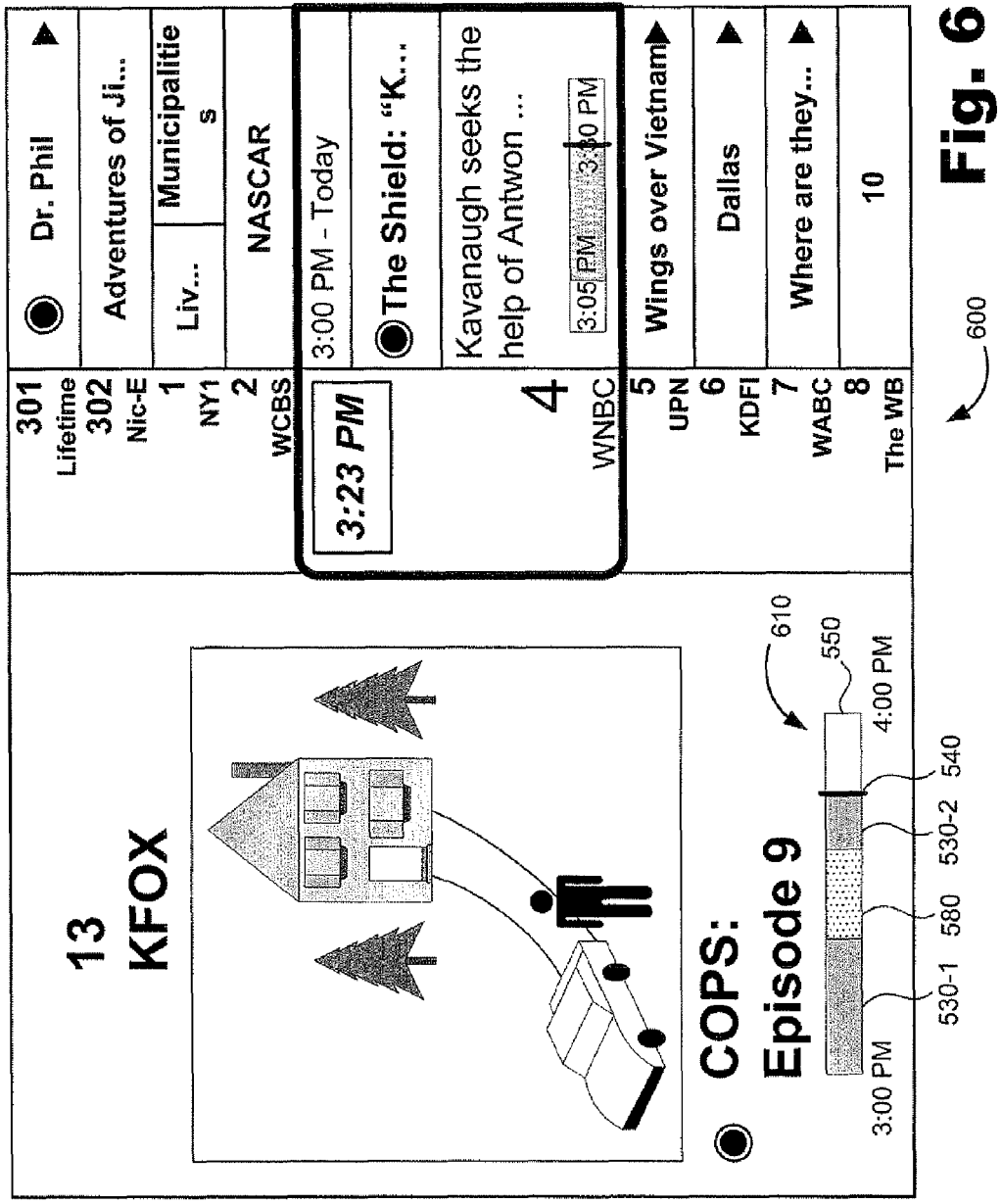
FIG. 6 illustrates an exemplary graphical user interface that may be presented by an output device, the graphical user interface including at least one recording status indicator.
Figure 7:
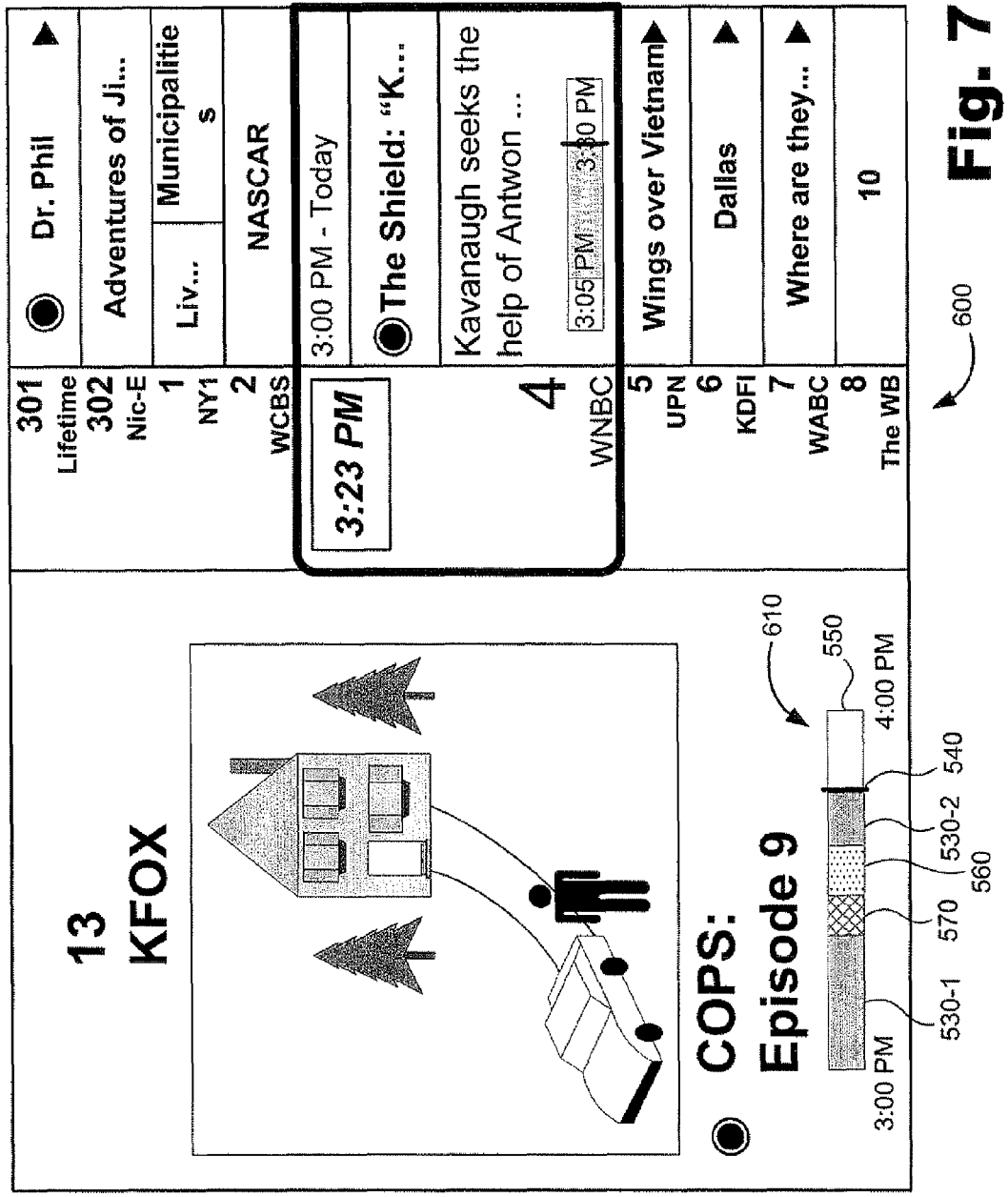
FIG. 7 illustrates another version of the exemplary graphical user interface of FIG. 6, the graphical user interface including a healing status indicator identifying a healed portion of media content.

FIGS. 6 and 7 illustrate an exemplary graphical user interface 600 in which one or more status indicators may be presented. Graphical user interface 600 is depicted as a program guide, although in other embodiments graphical user interface 600 may take other forms (e.g., recorded program list, program recording interface, etc.). As shown in FIG. 6, the graphical user interface 600 may include a recording status indicator 610 having one or more indicators of statuses of a recording and/or healing process. The recording status indicator 610 may include a recording progress indicator 540 indicating the current position of the recording process in relation to the media content program being recorded. In the recording status indicator 610, sections 530-1 and 530-2 represent successfully recorded content and section 550 represents "not-yet-recorded" content included in the media content program. Section 580 represents a defective status indicator representative of portion of the media content program that was not properly recorded. In FIG. 6, the defective section 580 also coincides with a failed recording portion of the recorded media content program 510 because healing of the defective portion 580 has not yet been performed.

As shown in FIG. 6, the different sections of the recording status indicator 610 may include or be associated with attributes (e.g., visual attributes such as shades, colors, patterns, etc.) configured to distinguish them from one another. For example, sections 530-1 and 530-2 may include a particular color or shade indicative of recorded content, section 550 may include another color or shade indicative of content that has not yet been recorded, and section 580 may include yet another color or shade indicative of content that is defective. The attributes may function as status indicators. For example, an attribute associated with section 580 may be referred to as a defective content status indicator.

The above-described status indicators are illustrative only. Other types of status indicators may be used in other examples. For example, the graphical user interface 600 may provide information representative of (e.g., numerical indications of) the start and end times of various sections included in the recording status indicator 610, including the start and end times of defective section 580. This may enable a user of content processing subsystem 110-1 to identify with particularity the specific portion(s) of a recording that are defective and initiate a request for one or more specific snippets of media content that may be stored by other content processing subsystems 110-2 through 110-N. For instance, the user may initiate a request including information identifying a particular media content program as well as a specific portion of the media content program being requested. In other implementations, the content processing subsystem 110-1 may be configured to detect a defective portion of a recorded media content program and automatically generate one or more healing operations, including transmitting a request for relevant media content that can be used to heal the defective portion of the recording.

In certain implementations, the content processing subsystem 110-1 may be configured to provide the user with a tool (e.g., a selectable icon) enabling the user to control whether future content healing operations will be initiated automatically by the content processing subsystem 110-1 or manually by the user. Accordingly, the content processing subsystem 110-1 may be configured to provide the user with a tool (e.g., another selectable icon and/or a request interface) enabling the user to manually initiate healing operations.

Other failed recording indicators may be used in other implementations. For example, a pop-up window may be displayed in the graphical user interface 600, the window including an explanation of the meaning and/or cause of a failed recording. As another example, an icon may be displayed, the meaning of which indicates to a user that a portion of a media content program being recorded was not or may not have been properly recorded. A combination of two or more of the above-described status indicators may be used. By providing one or more of the status indicators for presentation to a user, the content processing subsystem 110-1 allows the user to identify recording failures, including, for example, a specific portion of a recorded media content program that is or may be defective.

A defective portion of a recording may be healed as describe above, and at least one healing status indicator may be provided to the output device 112 for presentation to a user. The healing status indicator may identify a healed portion of a recorded media content program and/or provide other information concerning the status of healing operations. FIG. 7 illustrates an exemplary healing status indicator. In the recording status indicator 610 of FIG. 7, section 570 represents a healed portion of recorded media content and may be referred to as a healing status indicator. As shown in FIG. 7, section 570 may include or be associated with one or more attributes (e.g., visual attributes such as shades, colors, patterns, etc.) configured to distinguish section 570 from the other sections (e.g., from defective section 580) in the recording status indicator 610. For example, section 570 may include yet another color or shade indicative of content that has been healed and that distinguishes section 570 from other sections of the media content program 510. For example, sections 570 and 580 may include contrasting shades or colors that distinguish healed content from defective content. An attribute associated with section 570 may be referred to as a healing status indicator, which may identify the progress of operations for healing defective media content.

Another healing status indicator may be provided when healing of defective content in a recorded media content program has been completed. For example, the color or shading of section 570 may be changed once the content in section 580 has been completely healed.

Other healing status indicators may be used in other implementations. For example, a pop-up window may be displayed in the graphical user interface 600, the window including an explanation of the meaning and/or status of a healing process. As another example, an icon may be displayed, the icon indicating to a user that a portion of a media content program being recorded was healed, or recommending to a user that a portion of a media content program should be healed. As yet another example, a healing status indicator may indicate one or more sources of shared media content that are being used to heal a defective recording. Another example may include a numeric indication of the start and/or end times of the healed portion 570. A combination of two or more of the above-described status indicators may be used. By providing one or more healing status indicators for presentation to a user, the content processing subsystem 110-1 allows the user to identify specific healing events, including a specific portion of a recorded media content program that has been healed or should be healed. A healing status indicator may also help a user to appreciate the content healing capabilities of the content processing subsystem 110-1.

III. Exemplary Process View

Figure 8:
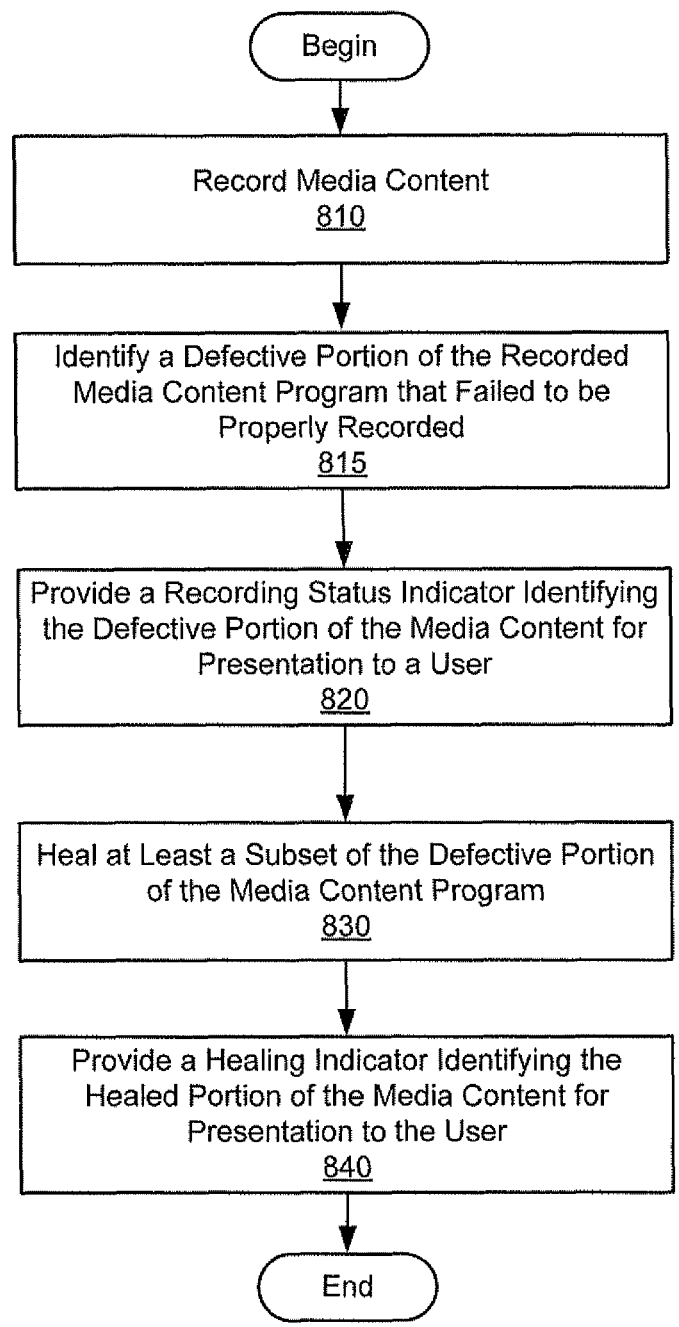
FIG. 8 illustrates an exemplary method of recording and healing media content.

FIG. 8 illustrates an exemplary method of recording and healing media content. While FIG. 8 illustrates exemplary steps according to one implementation, other implementations may omit, add to, reorder, and/or modify any of the steps shown in FIG. 8.

In step 810, media content is recorded. Step 810 may be performed in any of the ways described above, including the content recording application 243 instructing one or more elements of the content processing subsystem 110-1 to record at least a subset of a media content program received from the content delivery subsystem 111.

In step 815, a defective portion of the recorded media content program that failed to be properly recorded is identified. Step 815 may be performed in any of the ways described above, including the content processing subsystem 110-1 detecting at least one recording interruption and using the approximate start and end times of the interruption to determine the defective portion.

In step 820, at least one recording status indicator identifying a defective media content recording and/or the defective portion of the media content recording is provided for presentation to a user. Step 820 may be performed in any of the ways described above, including providing data representative of a failed recording status indicator to the output device 112 for presentation to the user.

In step 830, defective media content included in the recording is healed. Step 830 may be performed in any of the ways described above.

In step 840, at least one healing status indicator identifying a healed portion of the media content recording is provided for presentation to a user. Step 840 may be performed in any of the ways described above, including providing data representative of a healing status indicator to the output device 112 for presentation to the user.

IV. Alternative Implementations

The preceding description has been presented only to illustrate and describe exemplary implementations with reference to the accompanying drawings. It will, however, be evident that various modifications and changes may be made thereto, and additional implementations may be implemented, without departing from the scope of the invention as set forth in the claims that follow. The above description and accompanying drawings are accordingly to be regarded in an illustrative rather than a restrictive sense.

What is claimed is:

1. A method comprising:

receiving, by a content processing device associated with a user and communicatively coupled to a media content distribution subsystem by way of a network, at least a subset of a media content program from the media content distribution subsystem;

recording, by the content processing device, the at least a subset of the media content program, wherein the recorded at least a subset of the media content program comprises one or more recorded portions and a defective portion;

healing, by the content processing device, at least a subset of the defective portion with media content associated with the defective portion and stored on another content processing device associated with the user or another user and communicatively coupled to the media content distribution subsystem by way of the network; and providing, by the content processing device, a recording status indicator for presentation to the user, the recording status indicator identifying the one or more recorded portions and the defective portion;

wherein at least a portion of the healing occurs concurrently with the recording, and the method further comprises dynamically updating, by the content processing device, the recording status indicator as the recording and the healing progress.

2. A method comprising:

receiving, by a content processing device associated with a user and communicatively coupled to a media content distribution subsystem by way of a network, at least a subset of a media content program from the media content distribution subsystem;

recording, by the content processing device, the at least a subset of the media content program, wherein the recorded at least a subset of the media content program comprises one or more recorded portions and a defective portion;

healing, by the content processing device, at least a subset of the defective portion with media content associated with the defective portion and stored on another content processing device associated with the user or another user and communicatively coupled to the media content distribution subsystem by way of the network; and providing, by the content processing device, a recording status indicator for presentation to the user, the recording status indicator identifying the one or more recorded portions and the defective portion, wherein at least a portion of the healing occurs concurrently with the recording, and the method further comprises dynamically updating, by the content processing device, the recording status indicator as the recording and the healing progress.

3. A method comprising:

receiving, by a content processing device associated with a user and communicatively coupled to a media content distribution subsystem by way of a network, at least a subset of a media content program from the media content distribution subsystem;

recording, by the content processing device, the at least a subset of the media content program, wherein the recorded at least a subset of the media content program comprises one or more recorded portions and a defective portion;

healing, by the content processing device, at least a subset of the defective portion with media content associated with the defective portion and stored on another content processing device associated with the user or another user and communicatively coupled to the media content distribution subsystem by way of the network;

providing, by the content processing device, a recording status indicator for presentation to the user, the recording status indicator identifying the one or more recorded portions and the defective portion; and identifying, by the content processing device, the defective portion, wherein the identifying of the defective portion comprises generating a local checksum for the recorded at least a subset of the media content program, and comparing the generated local checksum with a master checksum for the media content program maintained by the media content distribution subsystem.

* * * * *